United States Patent [19]
Fazekas et al.

[11] 3,876,356
[45] Apr. 8, 1975

[54] COLD TRANSFER MOLDING APPARATUS

[75] Inventors: Thomas W. Fazekas, Stow; Walter A. Hartz, Cuyahoga, both of Ohio

[73] Assignee: The General Tire & Rubber Company, Akron, Ohio

[22] Filed: Mar. 7, 1974

[21] Appl. No.: 449,161

Related U.S. Application Data

[62] Division of Ser. No. 315,956, Dec. 18, 1972, abandoned.

[52] U.S. Cl. ............................ 425/144; 425/243
[51] Int. Cl. ............................................ B28b 17/00
[58] Field of Search ............ 425/243, 144; 264/328, 264/329

[56] References Cited
UNITED STATES PATENTS

| | | | |
|---|---|---|---|
| 1,993,942 | 3/1935 | Novotny | 264/328 |
| 2,828,507 | 4/1958 | Strauss | 425/243 |
| 2,865,050 | 12/1958 | Strauss | 425/243 |
| 3,341,644 | 9/1967 | Allen | 264/328 |
| 3,499,189 | 3/1970 | Perras | 425/144 |
| 3,544,518 | 12/1970 | Bodkins | 264/328 |
| 3,674,407 | 7/1972 | Neuhaus | 425/243 |

Primary Examiner—Al Lawrence Smith
Assistant Examiner—Robert C. Watson

[57] ABSTRACT

Apparatus for transfer molding in which the flashpad and most of the material within the runner is maintained below the temperature required to cure the molding material within the cure cycle time, while the material in the mold cavity and a relatively small amount of contiguous material in the runner is cured. A member is provided, between the mold and the transfer pot plate, which defines at least one runner in open communication with the mold cavity and the transfer pot. Adjacent the member is temperature-controlling means to maintain the material in the pot and most of the material in the runner at a temperature high enough to allow the material to flow and be molded, but below that required to cure the material within the cure cycle time.

19 Claims, 6 Drawing Figures

FIG. I 3,876,356

COLD TRANSFER MOLDING APPARATUS

This is a division, of application Ser. No. 315,956, filed Dec. 18, 1972, now abandoned.

BACKGROUND OF THE DISCLOSURE

This invention relates to transfer molding and more particularly, to apparatus for transfer molding which reduce substantially the amount of cured scrap.

Transfer molding is a preferred method for making many relatively small parts of thermosetting materials, such as the rubber inserts for automotive bushings, because a large number can be molded and cured at one time. By "thermoset," as used herein, is meant any thermosetting plastic, natural or synthetic rubber, or any other material which can be transfer molded.

The major parts of the typical transfer molding press are the upper and lower platens, the plunger plate, the plunger, the transfer pot plate and the mold which contains one or more mold cavities, and the runners leading thereto. Conventionally, these parts are all heated, such as by steam circulating in cores (drilled holes), located, for example, in the plunger plate, transfer pot plate and the mold. It has been standard practice to maintain all of the above-mentioned parts of the press at a generally uniform temperature.

At the end of the molding cycle, the material charge can be referred to as including three different portions: the molded part in the cavity, the runner and the flashpad. The result of the uniform temperature previously mentioned is that all three portions of the molding material are completely cured during the molding cycle and the runner and flashpad are disposed of as scrap. While the percent of the material charge which is scrapped will obviously vary, depending upon the relative sizes of the finished molded part, the runner and the flashpad, the following data for percent scrap from transfer molding of rubber inserts for automotive bushings is representative. Each group of data is a different transfer molding setup for a different insert, and the last column indicates the percent of the material charge which was cured and scrapped. The samples are from actual factory production runs.

| Group No. | Flash Weight(lb) | Part Weight(lb.) | No./Pad | Percent Scrap |
|---|---|---|---|---|
| 1 | 4.90 | .30 | 34 | 32.4 |
| 2 | 2.80 | .30 | 55 | 14.5 |
| 3 | 2.70 | .20 | 85 | 13.7 |
| 4 | 3.65 | .19 | 73 | 20.8 |
| 5 | 4.25 | .20 | 73 | 22.6 |
| 6 | 3.70 | .15 | 61 | 28.8 |
| 7 | 3.80 | .10 | 127 | 23.0 |
| 8 | 6.90 | .25 | 61 | 31.2 |

The average percent for these samples was 23.4 percent of the material loaded in the press becoming cured scrap. This represents a major drawback to the increased use of transfer molding, not only because of the direct material cost of the scrap, but even more importantly, because of the extra, but wasted, capacity needed in all of the preceeding operations, such as mixing, and raw material storage and handling. There are also excessive scrap handling and disposal costs.

A partial reduction in the ratio of scrap to finished product can be achieved by using a thinner charge, resulting in a thinner flashpad. This is an undesirable solution, however, since a thicker flashpad minimizes the detrimental effect of such variables as compound age, and batch-to-batch variance in hardness, viscosity, specific gravity and other properties.

SUMMARY OF THE INVENTION

Accordingly, it is an object of the present invention to provide apparatus for reducing the percent of cured scrap discarded from transfer molding presses.

It is a further and more specific object of the present invention to provide apparatus for use in transfer molding whereby the flashpad and at least some of the runner remain in the uncured state while the molded part cures.

It is also an object of the present invention to make transfer molding, using as thick a flashpad as is desirable, economically feasible.

These and other objects of the present invention, which will become evident upon reading the following detailed description, are accomplished by the provision of a member, positioned between the transfer pot and the mold, which defines a runner in open communication with the mold cavity and the transfer pot. There is also provided temperature controlling means adjacent the member adapted to maintain the transfer pot and a major portion of the runner at a temperature sufficient to allow the material charge to flow and be molded, but below the temperature required to cure the material within the curing cycle time, thus greatly reducing the amount of flash which is cured during each molding cycle and which must subsequently be disposed of as scrap.

In accordance with another aspect of the present invention, the temperature-controlling means comprises an assembly including a cooling plate, a heating plate, and insulation material positioned between the heating and cooling plates. The assembly defines at least one orifice extending therethrough for the insertion of the runner-defining member therein.

DESCRIPTION OF A PREFERRED EMBODIMENT

Figure 1:
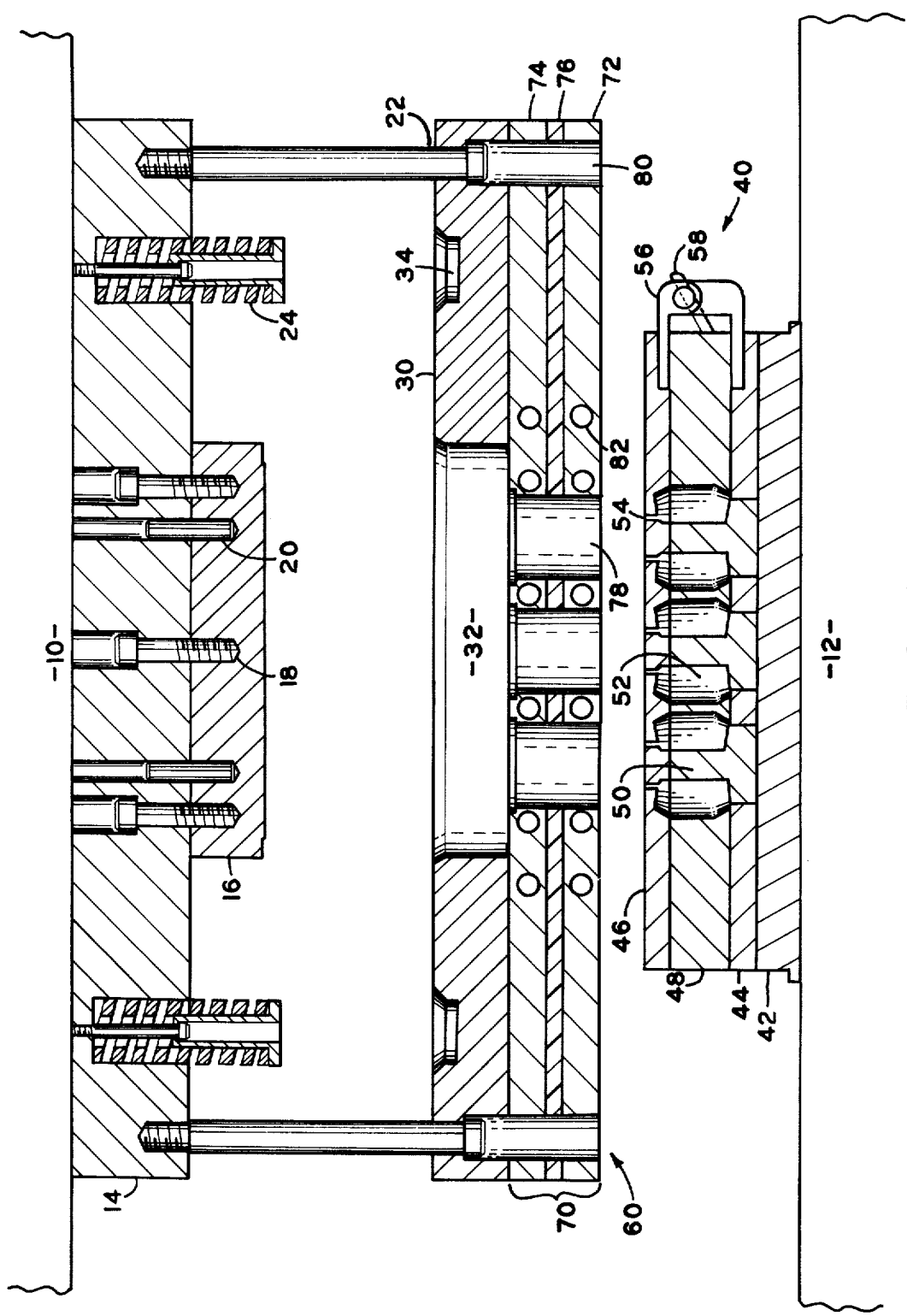
FIG. 1 is a cross section of a transfer molding press in accordance with a preferred embodiment of the present invention.

Referring now to the drawings which are only for the purpose of illustrating a preferred embodiment of the present invention and not for the purpose of limiting the same, FIG. 1 is a cross section of a transfer molding press partly equipped to utilize the teachings of the present invention. The press, with the parts shown in their between-cycle positions, includes a top platen 10, a bottom platen 12, a plunger plate 14, and a plunger 16, fastened to the plunger plate 14 by means of bolts 18, and aligned by dowel pins 20. The pot plate 30 has a central opening 32 called the transfer pot which in the subject embodiment is circular. Prior to the molding cycle, the material charge can be placed in the transfer pot 32. Positioned on the bottom platen 12 is the mold 40, which includes a base 42, a bottom mold plate 44, a top mold plate 46, a center mold plate 48, and a core form 50 for each mold cavity 52. The top mold plate 46 defines, in addition to the top portion of mold cavity 52, the pair of small passages or runners 54 through which the molding material enters the mold cavity 52. The top mold plate 46 and the bottom mold plate 44 are joined by hinge member 56, the operation of which will be described subsequently. The entire mold assembly 40 can be manipulated, i.e., pulled out of the press to be opened, by means of handle 58.

The conventional transfer molding press, not equipped to practice the present invention, includes, of the parts shown in FIG. 1, only those parts already described. In operation, the bottom platen 12 and the mold 40 are raised by the ram (not shown), until the top of top mold plate 46 is in contact with the underside of pot plate 30, which then rises with the mold and bottom platen to the end of the ram stroke, compressing springs 24 which bottom in spring seats 34. At the end of the stroke, in which the hydraulic ram typically exerts a pressure of about 2,000 p.s.i., a portion of the molding material is forced to fill the mold cavities 52, with the remainder of the material in the transfer pot 32 forming a flashpad. Because the conventional transfer molding press is maintained at a uniform temperature, from bottom platen to top platen, the flashpad cures just the same as the part in the mold cavity and is then removed and discarded as scrap.

Upon the completion of the curing cycle, the bottom platen 12, mold 40, and pot plate 30 are returned to the positions shown in FIG. 1, with the transfer pot plate 30 having its downward travel terminated by stripper bolts 22, and the mold 40 is slid out of the press onto an adjacent work area. The top mold plate 46 is pivoted about hinge 56 to leave the center mold plate 48 unobstructed so that it may be lifted by a set of pins (not shown) above the tops of the core forms 50, slid to a second adjacent work area and the molded parts ejected by another set of knockout pins. This sequence is then reversed as the mold 40 is returned to the position shown in FIG. 1, ready for the next molding cycle.

Plate and Insert Assembly

In accordance with the teachings of the present invention, the conventional transfer molding press is modified by the addition of the plate and insert assembly 60 which is preferably attached fixedly to the underside of pot plate 30. The purpose of the assembly 60 is to provide a runner, in open communication with the pot 32 and the mold cavity 52, and having most of its surface, which is in contact with the molding material, maintained "cold," rather than "hot." By "hot" is meant a temperature sufficient to completely cure the molding material within the desired cure cycle time. A rubber compound of the type used for an automotive bushing insert might be cured for ½ hour at about 300°F. to completely cure such a part. By "cold" is meant a temperature below that required for curing during the allotted time, and yet high enough so that the molding compound flows properly and can be molded. In the subject embodiment, and for the material used experimentally, this preferred compromise temperature was found to be about 170°F. Standard "cure vs. time" curves, for a given temperature, can be used to select the appropriate temperatures and cure times, for the particular material being used.

Figure 2:
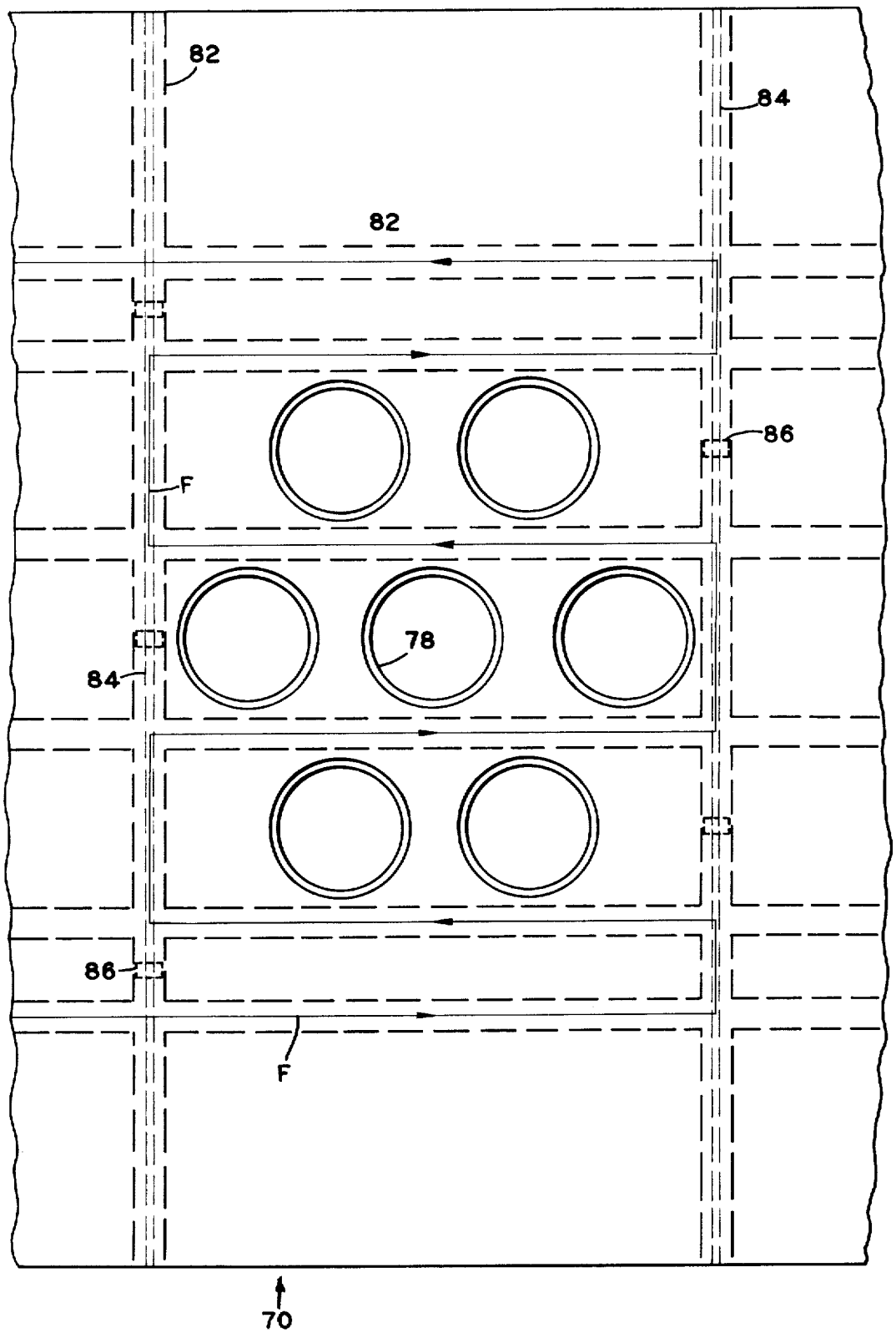
FIG. 2 is a fragmentary plan view of the plate assembly, on a larger scale than FIG. 1.
Figure 3:
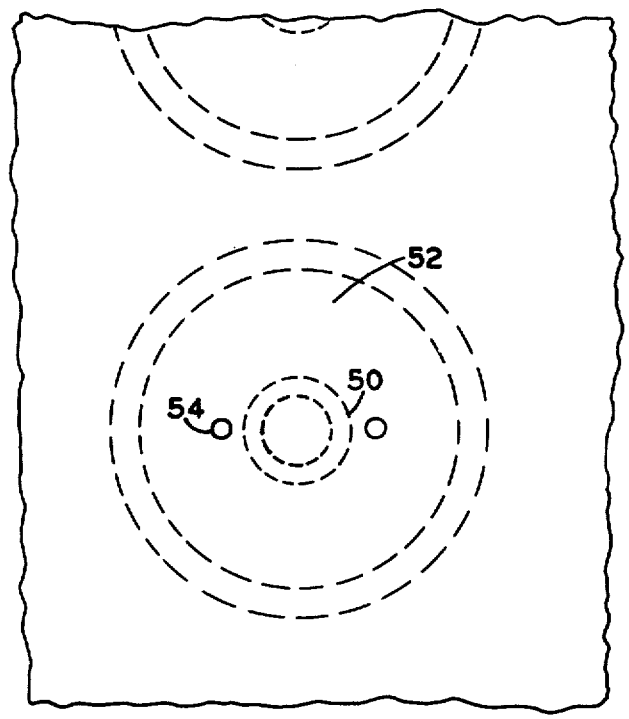
FIG. 3 is a fragmentary plan view of a mold of the type utilized with the present invention on a larger scale than FIG. 2.

The plate and insert assembly 60 includes the plate assembly 70 and the inserts 90. The plate assembly 70 comprises a heating plate 72, a cooling plate 74, and a layer of thermal insulation 76 positioned therebetween. As can best be seen in FIG. 2, there is a series of bores 78 extending through the plate assembly 70 for insertion therein of the inserts 90, of which there are seven in the subject embodiment, with one mold cavity 52, such as is shown in the plan view of FIG. 3, directly below each insert 90. The plate assembly 70 also has a series of bores 80 for the stripper bolts 22. The plate assembly serves as a temperature-controlling means with heating plate 72 maintaining the adjacent portion of insert 90 at a "hot" temperature, and the cooling plate 74 maintaining its adjacent portion of insert 90 at a "cold" temperature. The temperature control is achieved by means of a symmetrical plurality of interconnecting bores 82 (see FIG. 2), which act in cooperation with plug rods 84 having cylindrical plugs 86 to define a flow path F through the plate, as is well known in the mold art. All of the bores 82 are plugged at both ends, except at the inlet and the outlet (not shown). The flow path F (following the arrows) is preferably arranged so that each insert 90 has one of the bores 82, and therefore, part of the flow path F, passing on each side thereof. The above-described arrangement of bores and plugs can be the same in both the heating plate 72 and the cooling plate 74, and is so described herein. The heating plate 72 can be kept "hot" by the circulation of steam through the bores, along flow path F, whereas the cooling plate 74 is preferably kept "cold" by hot water circulating along flow path F of the cooling plate. It should be clearly understood that within the scope of the present invention, cooling and heating means other than water and steam can be employed, such as other hot gases and liquids, but water and steam are preferred because of their low cost and availability.

All of the separate parts of the plate and insert assembly 60, other than the insulation 76, may be made from any of the materials commonly used for press parts, such as cold-rolled steel, or cast steel, machined to the appropriate configuration.

The Insert

Figure 5:
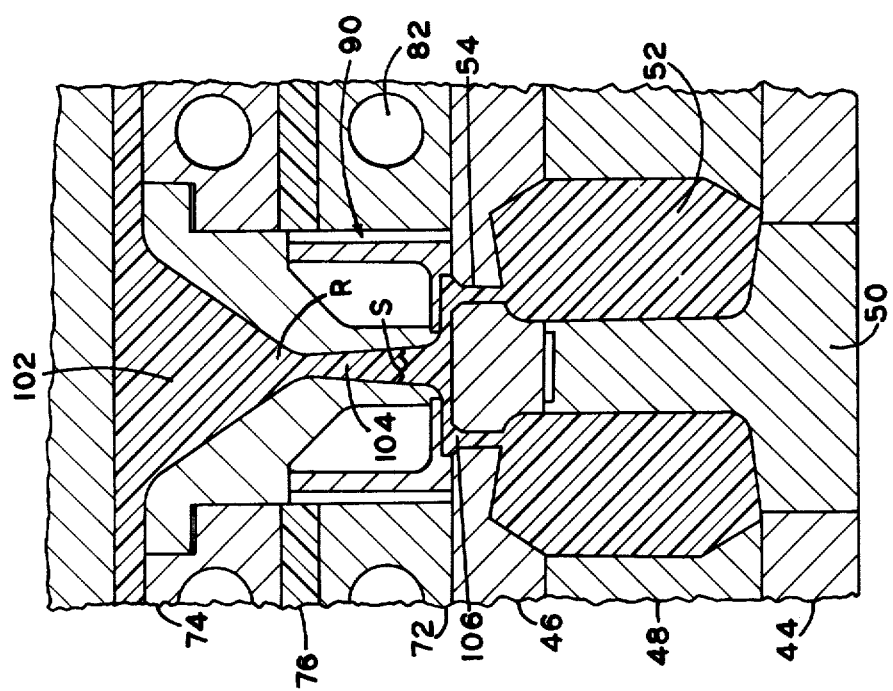
FIG. 5 is a fragmentary cross section illustrating the flow of material from the transfer pot into the mold cavity.

The function of the insert 90 is primarily to define a small passage or runner between the transfer pot 32 and the mold cavity 52 as is best shown in FIG. 5, and also conduct the heat from the adjacent plates 72, 74 in such a way that the majaor portion of the runner's surface area is maintained at the "cold" temperature. It is also desirable that the configuration of the runner be such that, at the end of the molding cycle, as the plate and insert assembly 60 and the mold 40 separate, the molding material in the runner ruptures at the interface between the cured material and the uncured material.

Figure 6:
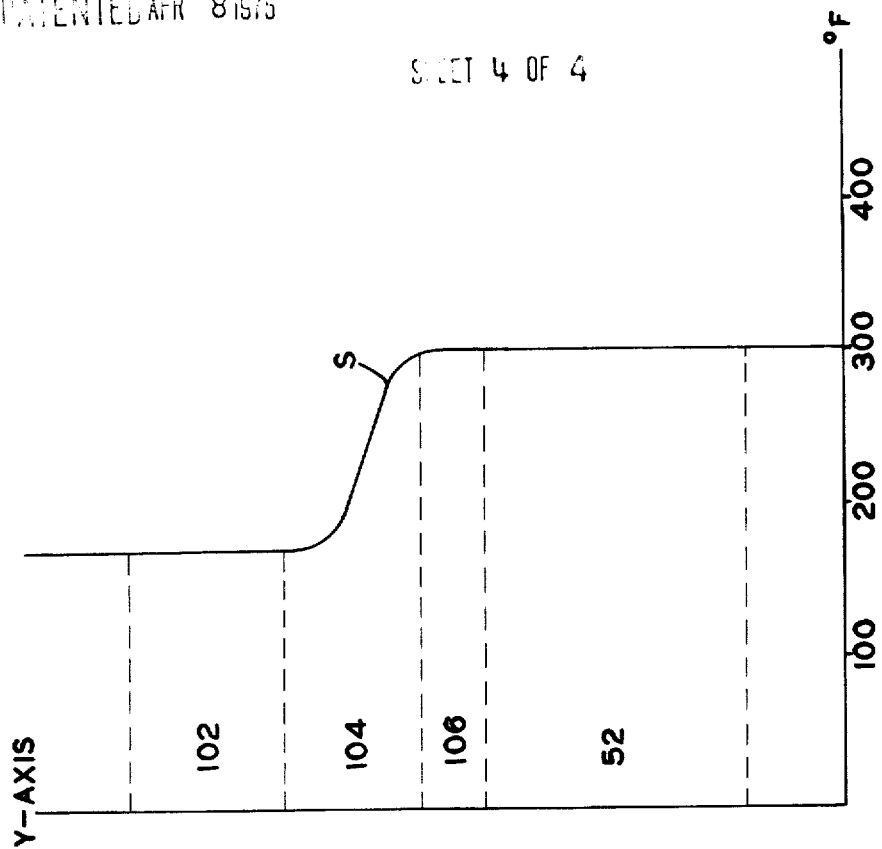
FIG. 6 is a graph showing the temperature of the mold cavity, runner and pot during molding.

The insert 90 (FIG. 4) includes an upper cylindrical member 92 and a lower cylindrical member 94. Members 92, 94 are shaped and joined in such a way as to form an included annular void 96 which serves as an insulation space between the "cold" upper cylindrical member 92 and the "hot" lower cylindrical member 94. The insert 90 defines a runner passage 100, which, in the subject embodiment, is mostly defined by the inner surface of the upper cylindrical member 92 and includes an upper portion or passage 102 shaped like a downwardly converging cone opening through a neck of reduced diameter into lower portion or passage 104 shaped like an upwardly converging cone. Portions or passages 102, 104 can both be classified generally as "cold," while recessed portion 106, including the material in runners 54, and bounded on its upperside by lower cylindrical member 94 is "hot." Because the cylindrical members 92, 94 meet at the juncture 108, there is some transfer of heat from lower cylindrical member 94 to upper cylindrical member 92 in the area of the juncture 108, with the result that the temperature gradient on the surface or runner passage 100 conforms to the curve shown in FIG. 6. The y-axis indicates the relative vertical position within the runner, with each point on the curve corresponding to a point on the surface of the runner 100 which is directly opposite, horizontally. The temperature-transition zone corresponds closely to the transition portion, in the material runner R, between the cured material and the uncured material (FIG. 5). It is in this transition portion that rupture, or separation between the cured and uncured portions should occur, approximately at separation line S, as the mold 40 is withdrawn from the underside of the plate and insert assembly 60 at the end of the mold cycle.

Figure 4:
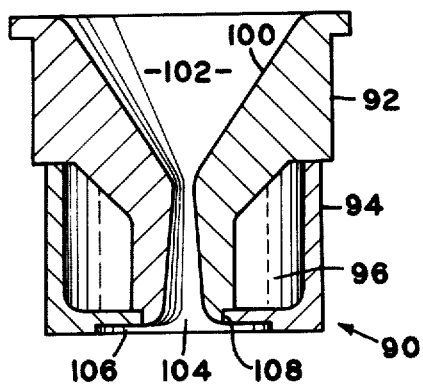
FIG. 4 is a cross section of the insert for the plate assembly, on the same scale as FIG. 3.

In the subject embodiment as shown in FIGS. 4 and 5, it is very important that the temperature gradient be such that rupture occurs in the runner lower portion 104 below the reduced neck entering into passage 102, because it is there that the material runner R is thinnest and can rupture most easily. If the cured material extended up into the runner upper portion 102, it would be larger in diameter than the runner lower portion 104 and could not as easily separate at the transition portion between the cured and uncured material and be removed as part of the cured flash.

The uncured material remaining in the runner 100 and the transfer pot 32 is then available for the subsequent molding cycle, either after the addition of another material charge or, if desirable, each material charge may be sufficiently large for two or more molding cycles. The amount of scrap material generated when transfer molding following the teachings of the present invention is only a fraction of that generated with conventional transfer molding techniques and apparatus. The difference can be readily appreciated by referring to FIG. 5 and comparing the relative amounts of material below the rupture or separation line S, down to and including recessed portion 106, all of which is scrap, and the material above separation line S including the whole flashpad in transfer pot 32. The ratio of uncured flash to cured flash may typically be in the range of about 5:1 to about 10:1, with the present invention thus representing a reduction in scrap of 80 percent to 90 percent.

In addition to the obvious advantages of greatly reducing the amount of raw material which becomes scrap, the present invention makes it possible to optimize the thickness of the flashpad, without concern about scrap, since none of the flashpad is wasted, when the disclosed method and apparatus are employed. The ability to use enough material to yield a thicker flashpad has the beneficial results discussed previously; of primary importance is the molding of more uniform parts. In the subject embodiment, the material charge was about one and one-half inches thick and substantially filled the transfer pot, and the flashpad left at the end of the molding cycle was just over three-eighths inches thick.

It should be apparent to one skilled in the art that many alternative arrangements could be utilized, within the spirit and scope of the present invention, to accomplish the disclosed purposes of the present invention, primarily, to control the molding temperatures in such a way that the flashpad and the major portion of the runner do not cure, but are subsequently usable. It is intended to include all such alternatives as part of the invention insofar as they come within the scope of the appended claims.

What is claimed is:

1. In a molding press including a mold defining at least one mold cavity having an opening extending outside said mold, a pot plate defining a molding compound transfer pot, and a plunger adapted to press molding compound out of said transfer pot into said mold cavity; the improvement being an improved molding compound temperature controlling apparatus disposed between said mold and said pot plate comprising:
   A. a composite body defining at least one body opening in communication between said transfer pot and said mold cavity and a molding compound temperature controlling member mounted within said body opening;
      1. said composite body comprising: a cooling plate disposed adjacent said pot plate; a heating plate disposed adjacent said mold; and a heat insulating layer disposed between said cooling plate and said heating plate; and
      2. said temperature controlling member comprising: an upper member mounted in heat transmitting exposure to said transfer pot and said cooling plate and defining an elongated runner passage extending substantially through said controlling member in communication between said transfer pot and said molding cavity; a lower member mounted with said upper member and in heat transmitting exposure to said mold and said heating plate; and heat insulating means defined by said lower member with said upper member and adapted to retard heat passage through said upper member along a lower portion of said runner passage.

2. The apparatus of claim 1 wherein said cooling plate is adapted to be maintained at a temperature suitable for proper flow of a molding compound as forced from said transfer pot through said runner passage into said mold cavity.

3. The apparatus of claim 1 wherein said heating plate is adapted to be maintained at the curing temperature of said mold.

4. The apparatus of claim 1 wherein said cooling plate defines a flow passage path for effectively routing heat exchange fluid through said cooling plate.

5. The apparatus of claim 1 wherein said heating plate defines a flow passage path for effectively routing heat exchange fluid through said heating plate.

6. The apparatus of claim 1 wherein said runner passage is defined in the shape of a downwardly converging upper cone opening through a neck of reduced size into an upwardly converging lower cone with said lower portion of said runner passage being within said lower cone.

7. The apparatus of claim 6 wherein said upper cone is of substantially greater median diameter than said lower cone.

8. The apparatus of claim 1 wherein said temperature controlling member is provided of generally cylindrical shape with said heat insulating means being defined in a generally annular shape.

9. The apparatus of claim 1 wherein said heat insulating means, said upper member and said lower member are adapted to coact during the curing of a molding compound in said mold cavity to permit curing of said compound upwardly into said runner passage no further than within said lower portion of said runner passage.

10. The apparatus of claim 1 wherein said heat insulating means comprises an air cavity defined around said lower portion of said runner passage between said upper member and said lower member.

11. The apparatus of claim 1 wherein said composite body defines a plurality of said body openings in respective communication between said transfer pot and a plurality of said mold cavities with a respective said temperature control member mounted within each said body opening.

12. The apparatus of claim 9 wherein said temperature controlling member is provided of generally cylindrical shape with said heat insulating means being defined in a generally annular shape.

13. The apparatus of claim 12 wherein said runner passage is defined in the shape of a downwardly converging upper cone opening through a neck of reduced size into an upwardly converging lower cone with said lower portion of said runner passage being within said lower cone.

14. The apparatus of claim 13 wherein said upper cone is of substantially greater median diameter than said lower cone.

15. The apparatus of claim 9 wherein said heat insulating means comprises an air cavity defined around said lower portion of said runner passage between said upper member and said lower member.

16. The apparatus of claim 13 wherein said cooling plate is adapted to be maintained at a temperature suitable for proper flow of a molding compound as forced from said transfer pot through said runner passage into said mold cavity.

17. The apparatus of claim 13 wherein said heating plate is adapted to be maintained at the curing temperature of said mold.

18. The apparatus of claim 13 wherein said composite body defines a plurality of said body openings in respective communication between said transfer pot and a plurality of said mold cavities with a respective said temperature control member mounted within each said body opening.

19. The apparatus of claim 6 wherein said heat insulating means, said upper member and said lower member are adapted to coact during curing of a molding compound in said mold cavity to permit curing of said compound upwardly into said runner passage no further than within said lower portion of said runner passage.

* * * * *